US 7,124,312 B2

(12) United States Patent
Casebolt et al.

(10) Patent No.: US 7,124,312 B2
(45) Date of Patent: *Oct. 17, 2006

(54) CAPACITIVE SENSING EMPLOYING A REPEATABLE OFFSET CHARGE

(75) Inventors: Mark W. Casebolt, Seattle, WA (US); Gary S. Rensberger, Redmond, WA (US); Steven N. Bathiche, Redmond, WA (US); Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/169,739

(22) Filed: Jun. 30, 2005

(65) Prior Publication Data

US 2005/0240785 A1  Oct. 27, 2005

Related U.S. Application Data

(63) Continuation of application No. 10/202,867, filed on Jul. 26, 2002, now Pat. No. 6,954,867.

(51) Int. Cl.
*G06F 1/32* (2006.01)

(52) U.S. Cl. ........................ 713/323; 713/320
(58) Field of Classification Search ................ 713/300, 713/320, 323; 345/163, 165, 166, 172, 156
See application file for complete search history.

(56) References Cited

U.S. PATENT DOCUMENTS

| | | |
|---|---|---|
| 3,333,160 A | 7/1967 | Gorski |
| 3,453,535 A | 7/1969 | Anglin |
| 3,551,919 A | 1/1971 | Forbes |
| 3,575,640 A | 4/1971 | Ishikawa |
| 3,588,038 A | 6/1971 | Tanaka |

(Continued)

FOREIGN PATENT DOCUMENTS

JP    5-181597 A    7/1993

(Continued)

OTHER PUBLICATIONS

Hal Philipp (Quantum Research Group Ltd.), The Charge Transfer Sensor, SENSORS, Nov. 1996, 4 pp., Helmers Publishing, Inc., Peterborough, NH.

(Continued)

*Primary Examiner*—Dennis M. Butler
(74) *Attorney, Agent, or Firm*—Banner & Witcoff

(57) ABSTRACT

Capacitive proximity sensing is carried out by detecting a relative change in the capacitance of a "scoop" capacitor formed by a conductor and a surrounding ground plane. Charge is transferred between the "scoop" capacitor and a relatively large "bucket" capacitor, and a voltage of the bucket capacitor is applied to an input threshold switch. A state transition (e.g., from low to high, or high to low) of the input threshold switch is detected and a value (TouchVal) indicative of a number of cycles of charge transfer required to reach the state transition is determined. The presence or absence of an object or body portion in close proximity to or contact with a device can be determined by comparing TouchVal with a predetermined threshold value (TouchOff). In order to lessen the time required for detection, and/or improve the sensitivity thereof, the bucket capacitor may initially be charged to a repeatable non-zero reference level closer to the charge level that will cause a state transition. TouchOff can be adjusted to take into account environmentally induced (non-touch related) changes in the capacitance of the scoop capacitor. Power management may be provided in a user operated data input device utilizing the inventive proximity sensing.

17 Claims, 5 Drawing Sheets

U.S. PATENT DOCUMENTS

| | | |
|---|---|---|
| 3,761,805 A | 9/1973 | Dornberger |
| 3,836,813 A | 9/1974 | Chambers |
| 3,922,526 A | 11/1975 | Cochran |
| 4,149,231 A | 4/1979 | Bukosky et al. |
| 4,203,153 A | 5/1980 | Boyd |
| 4,409,665 A | 10/1983 | Tubbs |
| 4,422,163 A | 12/1983 | Oldenkamp |
| 4,558,274 A | 12/1985 | Carusillo |
| 4,593,323 A | 6/1986 | Kanda et al. |
| 4,639,864 A | 1/1987 | Katzman et al. |
| 4,649,373 A | 3/1987 | Bland et al. |
| 4,698,748 A | 10/1987 | Juzswik et al. |
| 4,736,097 A | 4/1988 | Philipp |
| 4,743,837 A | 5/1988 | Herzog |
| 4,755,707 A | 7/1988 | Nakaya et al. |
| 4,766,567 A | 8/1988 | Kato |
| 4,806,846 A | 2/1989 | Kerber |
| 4,872,485 A | 10/1989 | Laverty, Jr. |
| 4,879,461 A | 11/1989 | Philipp |
| 4,907,183 A | 3/1990 | Tanaka |
| 4,922,450 A | 5/1990 | Rose et al. |
| 4,972,070 A | 11/1990 | Laverty, Jr. |
| 4,977,537 A | 12/1990 | Dias et al. |
| 5,012,406 A | 4/1991 | Martin |
| 5,025,516 A | 6/1991 | Wilson |
| 5,033,508 A | 7/1991 | Laverty, Jr. |
| 5,065,357 A | 11/1991 | Shiraishi et al. |
| 5,148,380 A | 9/1992 | Lin et al. |
| 5,159,276 A | 10/1992 | Reddy, III |
| 5,163,153 A | 11/1992 | Cole et al. |
| 5,175,845 A | 12/1992 | Little |
| 5,218,704 A | 6/1993 | Watts, Jr. et al. |
| 5,231,380 A | 7/1993 | Logan |
| 5,247,655 A | 9/1993 | Khan et al. |
| 5,249,298 A | 9/1993 | Bolan et al. |
| 5,255,341 A | 10/1993 | Nakajima |
| 5,256,913 A | 10/1993 | Sommer |
| 5,276,890 A | 1/1994 | Ariai |
| 5,294,889 A | 3/1994 | Heep et al. |
| 5,329,239 A | 7/1994 | Kindermann et al. |
| 5,355,503 A | 10/1994 | Soffel et al. |
| 5,369,443 A | 11/1994 | Woodham |
| 5,369,771 A | 11/1994 | Gettel |
| 5,371,693 A | 12/1994 | Nakazoe |
| 5,384,457 A | 1/1995 | Sommer |
| 5,396,443 A | 3/1995 | Mese et al. |
| 5,404,541 A | 4/1995 | Hirosawa et al. |
| 5,408,668 A | 4/1995 | Tornai |
| 5,428,790 A | 6/1995 | Harper et al. |
| 5,461,321 A | 10/1995 | Sanders et al. |
| 5,508,700 A * | 4/1996 | Taylor et al. ................. 341/33 |
| 5,557,440 A | 9/1996 | Hanson et al. |
| 5,566,702 A | 10/1996 | Philipp |
| 5,570,869 A | 11/1996 | Diaz et al. |
| 5,572,205 A | 11/1996 | Caldwell et al. |
| 5,590,343 A | 12/1996 | Bolan et al. |
| 5,669,004 A | 9/1997 | Sellers |
| 5,682,032 A | 10/1997 | Philipp |
| 5,730,165 A | 3/1998 | Philipp |
| 5,854,621 A | 12/1998 | Junod et al. |
| 5,903,767 A | 5/1999 | Little |
| 5,925,110 A | 7/1999 | Klein |
| 5,990,868 A | 11/1999 | Frederick |
| 6,172,354 B1 | 1/2001 | Adan et al. |
| 6,188,228 B1 | 2/2001 | Philipp |
| 6,232,957 B1 | 5/2001 | Hinckley |
| 6,269,449 B1 | 7/2001 | Kocis |
| 6,288,706 B1 | 9/2001 | Leman |
| 6,288,707 B1 | 9/2001 | Phillipp |
| 6,303,924 B1 | 10/2001 | Adan et al. |
| 6,304,249 B1 | 10/2001 | Derocher et al. |
| 6,333,753 B1 | 12/2001 | Hinckley |
| 6,373,047 B1 | 4/2002 | Adan et al. |
| 6,377,009 B1 | 4/2002 | Philipp |
| 6,396,477 B1 | 5/2002 | Hinckley et al. |
| 6,452,514 B1 | 9/2002 | Philipp |
| 6,457,355 B1 | 10/2002 | Philipp |
| 6,466,036 B1 | 10/2002 | Philipp |
| 6,531,692 B1 | 3/2003 | Adan et al. |
| 6,535,200 B1 | 3/2003 | Philipp |
| 6,611,921 B1 | 8/2003 | Casebolt et al. |
| 6,661,410 B1 | 12/2003 | Casebolt et al. |
| 6,781,570 B1 * | 8/2004 | Arrigo et al. ................ 345/158 |
| 6,816,150 B1 | 11/2004 | Casebolt et al. |
| 6,850,229 B1 | 2/2005 | Casebolt et al. |
| 2001/0015718 A1 | 8/2001 | Hinckley et al. |
| 2002/0030666 A1 | 3/2002 | Philipp |
| 2002/0067334 A1 | 6/2002 | Hinckley et al. |
| 2002/0083357 A1 | 6/2002 | McGowan et al. |
| 2002/0093481 A1 | 7/2002 | Kehlstadt |
| 2002/0126094 A1 | 9/2002 | Junod et al. |
| 2003/0132922 A1 | 7/2003 | Philipp |
| 2004/0008129 A1 | 1/2004 | Philipp |
| 2004/0104826 A1 | 6/2004 | Philipp |
| 2005/0041018 A1 | 2/2005 | Philipp |
| 2005/0052429 A1 | 3/2005 | Philipp |
| 2005/0078027 A1 | 4/2005 | Philipp |

FOREIGN PATENT DOCUMENTS

| | | |
|---|---|---|
| WO | WO 95/25385 | 9/1995 |
| WO | WO 98/05025 | 2/1998 |
| WO | WO 00/44018 | 7/2000 |

OTHER PUBLICATIONS

IBM Corp., Personal Computer Environmental Control Via a Proximity Sensor, IBM Technical Disclosure Bulletin, Aug. 1993, vol. 36, No. 08.

Brett Glass, Power Management, BYTE, Sep. 1991, pp. 329-335.

G.J. Yeh, I. Dendo, W.H. Ko, Switched Capacitor Interface Circuit for Capacitive Transducers, 1985, pp. 60-63, CH2127-9/85/0000-0060, IEEE.

Jim Williams, Applications for a Switched-Capacitor Instrumentation Building Block, Jul. 1985, pp. AN3-1-AN3-16, Application Note 3, Linear Technology.

Mirsuhiro Yamada, Takashi Takebayashi, Shun-Ichi Notoyama, and Kenzo Watanabe, A Switched Capacitor Interface for Capacitive Pressure Sensors, 1992, pp. 81-86, IEEE.

Paul Dietz et al., "DiamondTouch: A Multi-User Touch Technology," UIST '01, Nov. 11-14, 2001, pp. 219-226.

\* cited by examiner

Fig. 4
(RELATED ART)
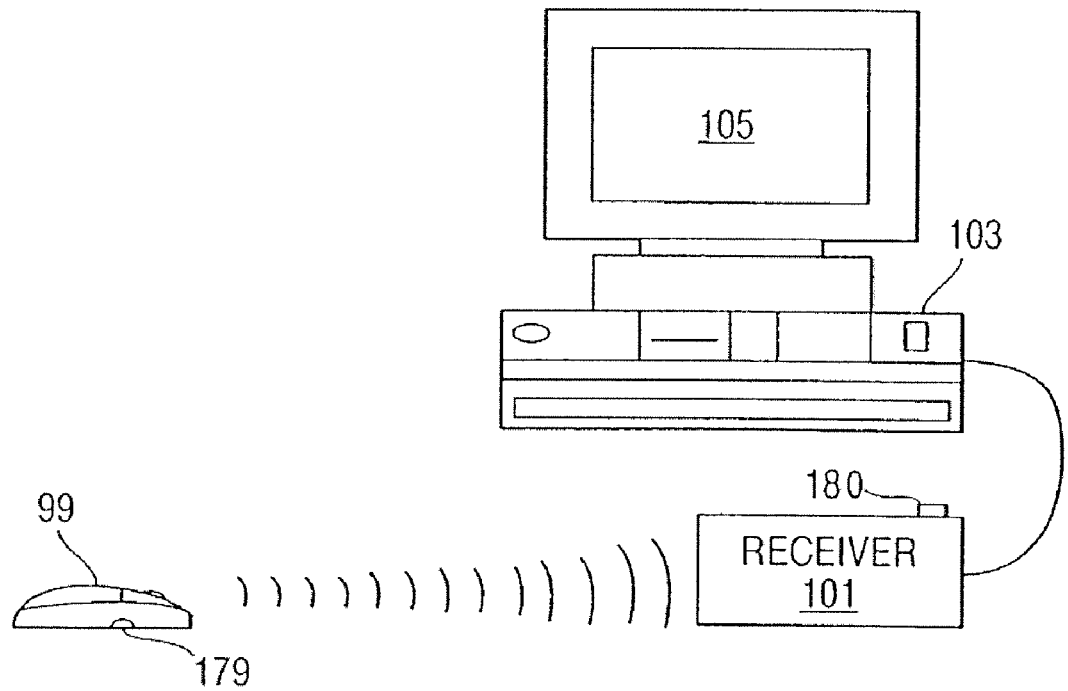
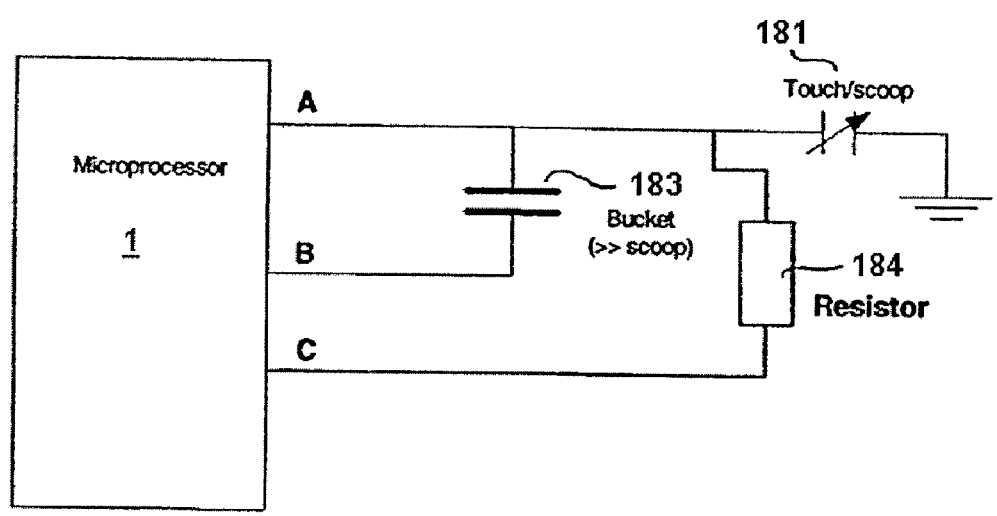
Fig. 5

CAPACITIVE SENSING EMPLOYING A REPEATABLE OFFSET CHARGE

CROSS-REFERENCE TO RELATED APPLICATIONS

This application is a continuation of U.S. patent application Ser. No. 10/202,867, filed Jul. 26, 2002 now U.S. Pat. No. 6,954,867 and titled "Capacitive Sensing Employing a Repeatable Offset Charge," which application is hereby incorporated by reference in its entirety.

FIELD OF THE INVENTION

The present invention relates to sensing systems and methods that may be advantageously used in managing power consumption in electronic devices, particularly hand operated data input devices, and for other purposes. More specifically, the invention relates to sensing systems and methods that may be used to conserve battery power in wireless data input devices having components that consume power at a relatively high rate.

BACKGROUND OF THE INVENTION

Power management in electronic devices is becoming increasingly important as greater reliance is placed on battery power, e.g., for portable computers, personal data assistants (PDAs), tablet computers, cellular phones, pagers, and wireless computer peripherals. The components of such devices are becoming increasingly power hungry, and the demand for longer intervals between battery replacement or recharging has increased. Such devices are often turned on for ready usability but left idle for significant periods of time. This presents an opportunity to reduce depletion of battery power through the use of reduced power modes.

Recently, wireless peripheral devices intended for use with a host computer have been introduced. In particular, cursor control (pointing) devices such as a computer mouse and trackball device have been made wireless by inclusion of a battery power source within the device and the provision of a wireless data link, e.g., an infrared or RF transmitter/receiver pair. Without effective power management, continuous operation of such wireless peripherals will rapidly deplete the limited battery power of the device, thus requiring frequent battery replacement or recharging.

In another line of technological development, cursor control devices utilizing optical surface tracking systems have been introduced and are increasingly being used in lieu of devices relying on conventional opto-electric encoder wheel arrangements. Optical tracking can provide more reliable and accurate tracking by eliminating moving parts (e.g., a ball and associated encoder wheels), which are prone to malfunction from the pick-up of dirt, oils, etc. from the tracked support surface and/or a user's hand. On the other hand, optical tracking requires considerably more power for driving the circuitry used to illuminate a trackable surface and to receive and process light (image information) reflected from the trackable surface. Exemplary optical tracking systems, and associated signal processing techniques, are disclosed in commonly owned U.S. Pat. No. 6,172,354 (Adan et al.) and copending applications Ser. No. 09/692,120, filed Oct. 19, 2000, and U.S. Ser. No. 09/273,899, filed Mar. 22, 1999, each of which is hereby incorporated by reference in its entirety.

Heretofore, limited use of optical tracking systems has been made in wireless cursor control devices, due to the relatively large power requirements of both the optical tracking system and the wireless data transmitter. In one recent offering, the Logitech Cordless Mouseman® Optical, multiple sleep and awake modes are utilized to increase battery life. Switching from a full run mode through a succession of reduced power modes is carried out based upon durations of user inactivity. Whenever the user moves the mouse or clicks a mouse button, the mouse returns to the full run mode.

Various types of user proximity detectors are known, and used in power management systems and myriad other applications. For example, Tournai U.S. Pat. No. 5,408,668 describes a processor based control system for connecting and disconnecting a computer peripheral device (e.g., a display monitor or printer) to a power source. The control is based upon input activity signals received from an input source such as a keyboard, mouse, printer or an occupancy sensor.

Mese et al. U.S. Pat. No. 5,396,443 describes power saving control arrangements for information processing apparatus. More specifically, the Mese et al. '443 patent describes various systems for (1) detecting the approach (or contact) of a user associated medium to (or with) the apparatus; (2) placing a controlled object of the apparatus in a non-power saving state when such contact or approach is detected; and (3) placing the controlled object in a power saving state when the presence of the user associated medium (i.e., a stylus pen or part of a user's body) is not detected for a predetermined period of time.

The '443 patent describes various types of approach/contact sensors. Among these, various "tablet" type sensor systems are described, including electromagnetic, capacitance, and electrostatic coupling tablets. In one embodiment, a contact or approach detecting tablet, and a flat display panel, may be integrally formed with a housing of the information processing apparatus.

Philipp U.S. Pat. No. 5,730,165 describes a capacitive field detector used to provide on-off control of a water fountain or wash basin faucet, based upon a detected approach or presence of a user.

In one embodiment of the Philipp '165 patent, a voltage-limited current source feeds a charging current to a plate. At the end of a charging interval, a discharge switch controlled by a microprocessor closes briefly to discharge the sensing plate into a charge detector, e.g., a charge detecting capacitor. The amount of charge so transferred is representative of the capacitance of the sensing plate. The charge-discharge process can be repeated numerous times, in which case the charge measurement means aggregates the charge from the plate over several operating cycles. After a predetermined number of cycles of charge and discharge, the charge detector is examined for total final charge, by an A/D converter, and as a result the controller may generate an output control signal on an output line, which may be used to cause a faucet to open. After each reading, the controller resets the charge detector to allow it to accumulate a fresh set of charges from the plate. Alternatively, the controller can take a reading after each individual cycle of the discharging switch, and then integrate (or otherwise filter) the readings over a number of cycles prior to making a logical decision resulting in a control output.

Sellers U.S. Pat. No. 5,669,004 describes a system for reducing power usage in a personal computer. More specifically, a power control circuit is disclosed for powering down portions of a personal computer in response to user inactivity, and for delivering full power to these portions once user activity is detected via one or more sensors. The components to which power is reduced (or removed) are components, which can respond almost immediately to being turned on. On the other hand, components which require a period of time to come up to full operation (e.g., disk drive motors, monitor, main processor) are driven to full power. In the primary embodiment that is disclosed, the sensor is a piezoelectric sensor fitted into a keyboard. Sellers discloses that sensors may be positioned at other locations on the computer (a monitor, mouse, trackball, touch pad or touch screen) and that various other kinds of sensors (capacity, stress, temperature, light) could be used instead of piezoelectric sensors.

Commonly owned copending U.S. patent application Ser. No. 09/948,099 (hereby incorporated by reference), filed Sep. 7, 2001 and published under No. 20020035701 on Mar. 21, 2002, discloses capacitive sensing and data input device power management systems and methods. In the disclosed embodiments, capacitive proximity sensing is carried out by detecting a relative change in the capacitance of a "scoop" capacitor formed by a conductor and surrounding ground plane. The conductor may be a plate provided in the form of an adhesive label printed with conductive ink. Charge is transferred between the scoop capacitor and a relatively large "bucket capacitor," and a voltage of the bucket capacitor is applied to an input threshold switch. A state transition from low to high (or high to low) of the input threshold is detected, and a value indicative of the number of cycles of charge transfer required to reach the state transition is determined. The presence or absence of an object or body portion in close proximity to or in contact with a device can be determined by comparing the value with a predetermined threshold. The predetermined threshold can be adjusted to take into account environmentally induced changes in capacitance of the scoop capacitor.

With the above system implemented, e.g., in a wireless optical mouse or handheld digitizing pen, a change in environmental capacitance caused by the proximity of a user's hand is detected so that power can be saved by turning "off" the high current optical (or other type of) tracking system when the mouse/pen is not in use. The determination of this condition requires periodic sequences of microprocessor operation, causing increased current draw during the detection interval. This interval remains relatively long, because each time the touch system is operated a count is generated as the "bucket" capacitor is charged from 0 Volts up to the arbitrary threshold determined by the internal comparator.

The typical mouse user wants no sign of lag or delay in mouse response. Users are generally sensitive to motion down to approximately 0.01 ips and can move a mouse up to approximately 25 ips. Optical tracking affords a level of responsiveness commensurate with user sensitivities. When capacitive sensing techniques, e.g., as described in application Ser. No. 09/948,099, are used to detect operator interaction, however, aggressive users, e.g., gamers utilizing a mouse or other gaming peripheral (e.g., a gamepad), may move fast enough to notice a lack of responsiveness, due to the interval delay required to successfully detect a hand actuation. Sampling at a higher rate can alleviate perceived deficiencies in responsiveness, but increased sampling adversely affects battery life.

The use of battery power for optical tracking in computer mice and other data input devices presents a significant challenge from a power management perspective. Known optical tracking engines requires substantial current from the limited battery source. Additionally, the time and energy that it takes to detect hand presence limit the periodicity (frequency) with which detection sampling might take place. A faster, more power efficient, detection system would advantageously allow increased periodicity of the sampling and thus a more responsive detection of hand presence, and/or increased battery life.

SUMMARY OF THE INVENTION

In view of the foregoing, the present invention has as an object to reduce the time and energy required to successfully detect the presence of a human hand or other instrumentality in contact or close proximity with a data input device, e.g., a computer mouse, while improving the reliability of the detection. The capacitive sensing systems and methods of the invention may be advantageously utilized to provide effective power management in user operated data input devices. The invention is not limited to power management, however, and can be implemented in essentially any application (data input devices or otherwise) where there is a desire to reliably and efficiently sense the presence (or absence) of an object or body portion in contact with or close proximity to another object. Particularly advantageous use may be made of the inventive capacitive sensing together with power management systems and methods as described in copending commonly owned U.S. application Ser. No. 09/948,099, to substantially increase battery life in a wireless cursor control device (e.g., computer mouse or trackball device) or other user operated data input device, e.g., a wireless gaming peripheral such as a gamepad, or a handheld digitizing pen, especially one including circuit components (e.g., an optical tracking system and/or RF transmitter) that draw relatively large amounts of electrical power.

In accordance with the present invention, the system and method disclosed in U.S. application Ser. No. 09/948,099 may be modified such that an arbitrary but repeatable non-zero offset charge level of the bucket capacitor is set at the initiation of a detection sequence. Such an offset charge induced into the bucket capacitor allows the count range to be reduced by an amount proportional to the offset charge. For example, an offset charge causing the sample period to be reduced by half would allow determination of a hand presence twice as often, doubling responsiveness of the system to operator actuation. Similarly, an offset which reduces the sample period to one fourth would not only allow the responsiveness to improve by 2:1 but also a reduction by one half of the power required to carry out detection in a suspend state of the mouse. Utilizing the present invention, an offset charge and interval rate may be chosen to optimize both of these parameters.

In one embodiment of the invention, a resistor may be wired to an unused or multifunction port pin of a control microprocessor, which allows the microprocessor to inject current into the bucket capacitor prior to the sampling interval. Charge injection is a function of the applied voltage duration (time), the resistor value, and the bucket capacitor value. In accordance with the invention, the precharge is made repeatable and falls below a range of normal operation for the sample interval. Each sample interval then would accumulate to, e.g., 20 or 30 counts, instead of 100–110 counts.

In a first aspect, the invention is embodied in a capacitive sensing system for sensing the presence of an object or body portion in contact or close proximity to another object. A first conductor is capacitively coupled to a ground to thereby form a scoop capacitor having a capacitance which varies in relation to the proximity of the object or body portion to the conductor. A pair of second and third conductors form a bucket capacitor having a capacitance which is larger than a maximum capacitance of the scoop capacitor, and an input threshold switch is provided. Charge setting means are provided for setting a charge of the bucket capacitor at a repeatable non-zero reference level. Switching means are provided for selectively: connecting at least one of the scoop capacitor and bucket capacitor to a voltage source to charge the at least one capacitor, connecting the charge setting means to the bucket capacitor to set the charge of the bucket capacitor to the repeatable non-zero reference level, varying the charge of the bucket capacitor from the reference level set by the charge setting means, in relation to a relative size of the scoop capacitor, and applying a voltage of the bucket capacitor to the input threshold switch. A detector means is provided for detecting an input state of the input threshold switch. Determining means determine a value (TouchVal) relating to a number of cycles of varying of the bucket capacitor charge corresponding to a detection of a transition of the input threshold switch by the detector means. Signal generating means generate, based upon TouchVal, a signal indicative of an ON state wherein the object or body portion is in contact with or close proximity to another object, and an OFF state wherein the object or body portion is not in contact with or close proximity to another object.

In a second aspect, the invention is embodied in a method for sensing the presence of an object or body portion in contact with or close proximity to another object. The method is carried out with a first conductor capacitively coupled to a ground to thereby form a scoop capacitor having a capacitance which varies in relation to the proximity of the object or body portion to the conductor. A pair of second and third conductors are provided, which form a bucket capacitor having a capacitance which is larger than a maximum capacitance of the scoop capacitor; an input threshold switch is also provided. Switching is performed to selectively: connect at least one of the scoop capacitor and the bucket capacitor to a voltage source to charge the at least one capacitor, set a charge of the bucket capacitor at a repeatable non-zero reference level, vary the charge of the bucket capacitor from the reference level, in relation to a relative size of the scoop capacitor, and apply a voltage of the bucket capacitor to the input threshold switch. An input state of the input threshold switch is detected. A value (TouchVal) is determined, which relates to a number of cycles of varying the bucket capacitor charge corresponding to a detection of a transition of the input threshold switch. Based upon TouchVal, a signal is generated which is indicative of an ON state wherein the object or body portion is in contact with or close proximity to another object, and an OFF state wherein the object or body portion is not in contact with or close proximity to the object.

The above and other objects, features and advantages of the present invention will be readily apparent and fully understood from the following detailed description of preferred embodiments, taken in connection with the appended drawings.

BRIEF DESCRIPTION OF THE DRAWINGS

FIG. 4 is a diagrammatic illustration of a wireless mouse to which the present inventive capacitive sensing system may be applied, linked to a host computer by an RF transmitter/receiver pair.

FIG. 5 is a circuit schematic of a capacitive proximity sensing system in accordance with the present invention.

DETAILED DESCRIPTION OF THE PREFERRED EMBODIMENTS

The present inventive systems and methods are described herein in terms of an exemplary application thereof within a computer input device, particularly a wireless, optically tracking computer mouse. It will be understood, however, that the inventions have much wider-ranging potential application. The capacitive sensing of the present invention is not limited to power management, but rather can be implemented in virtually any device (data input device or otherwise) where it is desired to determine the presence or non-presence of an object or body portion in contact with or close proximity to another object. This includes many applications where various other types of proximity sensors have been used, e.g., water valve actuation in toilets, faucets and drinking fountains, automatic door control systems, alarm systems, security lock systems and safety interlock systems (e.g., for industrial equipment), etc.

It will be understood that the phrase "contact with or close proximity to another object" as used herein encompasses contact or close proximity with a localized object portion as well as an object in toto, and the use of multiple sensors in conjunction with each other. Thus, e.g., the inventive capacitive sensing system and method may be implemented with plural sensors for position determination purposes and/or for carrying out position dependent data input, interface or other functionalities. Such functionalities, may include, e.g., touch pad and touch strip functionalities, as well as various computer/user interface functionalities, such as are disclosed, e.g., in co-owned copending application Ser. No. 09/804, 496, filed Mar. 9, 2001 (and its parent applications).

The power management aspects of the present invention may find useful application in various types of user operated data input devices—portable and non-portable, wireless and wired, self-contained and peripheral, e.g., to a host computer. The invention finds particularly useful application (but is not limited to) battery powered devices which are intermittently used and generally left on over extended periods of time so as to provide ready usability when demand so requires. Such devices include (but are not limited to) portable computers, personal data assistants (PDAs), tablet computers, cellular phones, pagers and wireless computer and gaming peripherals, e.g., mice, keyboards, gamepads and handheld digitizing pens.

Figure 1:
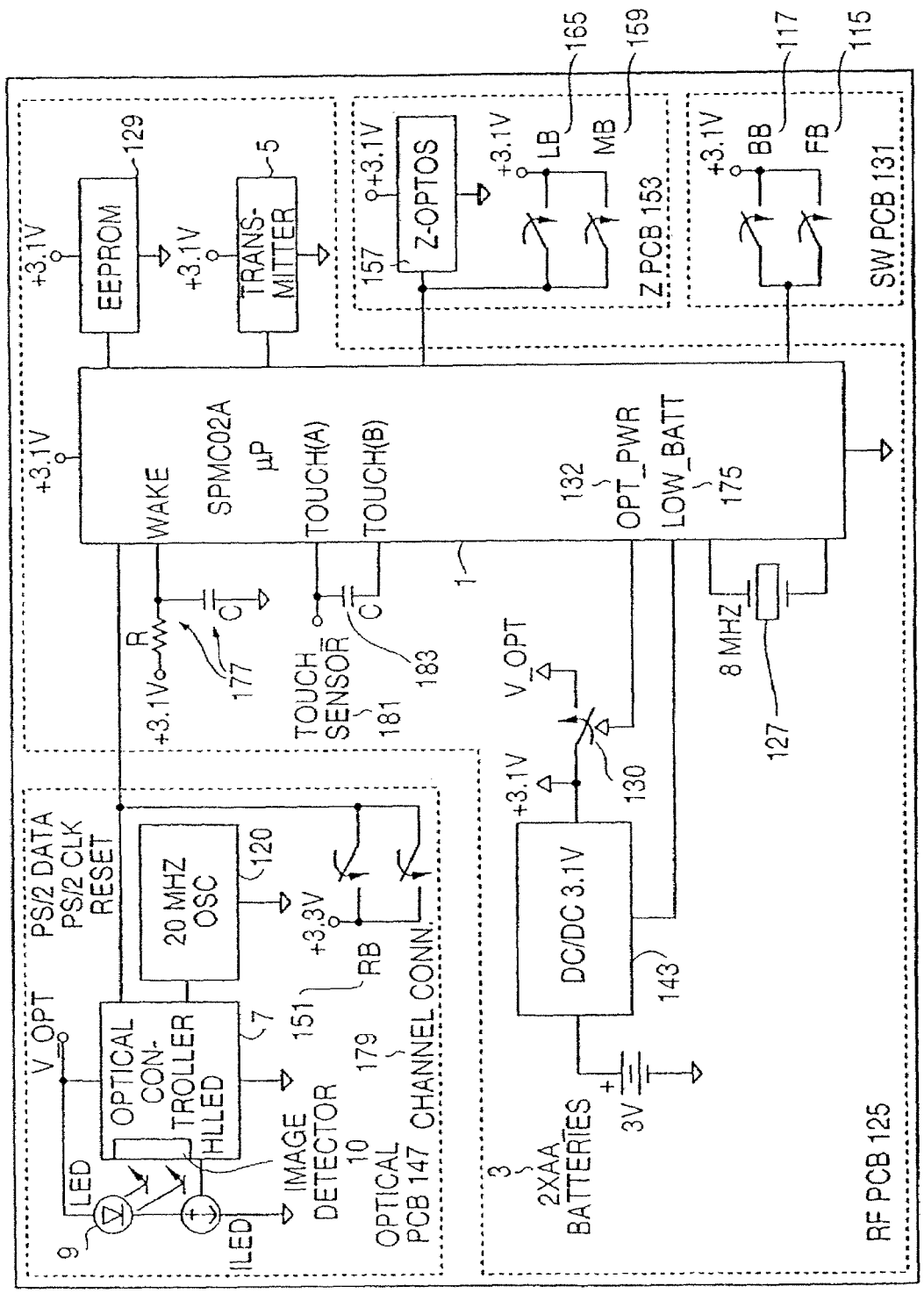
FIG. 1 is a block diagram of an electrical circuit of a wireless, optical surface tracking mouse that may employ a capacitive sensing system in accordance with the present invention.

The block diagram of FIG. 1 shows the circuitry of an exemplary computer mouse that may incorporate a sensing system in accordance with the present invention. The mouse is a wireless mouse employing an optical surface tracking system. Control logic may be implemented in firmware within a control integrated circuit (IC) 1, e.g., a Sunplus SPMCO2A microprocessor (µP), available from Sunplus Technology Company, Ltd. of Hsinchu, Taiwan, or an application specific integrated circuit (ASIC). In addition to managing the power supplied to the system (e.g., by 2 AA batteries 3), μP 1 performs signal processing and output functions of the mouse, and controls the wireless transmission of data packets to a host computer via an RF transmitter 5.

An optical controller IC 7 forms part of an optical tracking engine, controlling illumination of a LED light source 9 which is used to illuminate a trackable surface (e.g., a desktop). IC 7 also processes signals received from an image detector 10 (which may be included as part of IC 7) that receives light reflected from the trackable surface. The images are processed by IC 7 using spatial correlation to determine relative displacement values, in pixel or sub-pixel intervals. A stream of relative displacement values are communicated by IC 7 to μP 1 for further processing of the signals into data packets used by the host computer to control the movement of a displayed mouse cursor. μP 1 controls an RF transmission section 5 of the mouse to transmit the data packets to the host computer.

Figure 2:
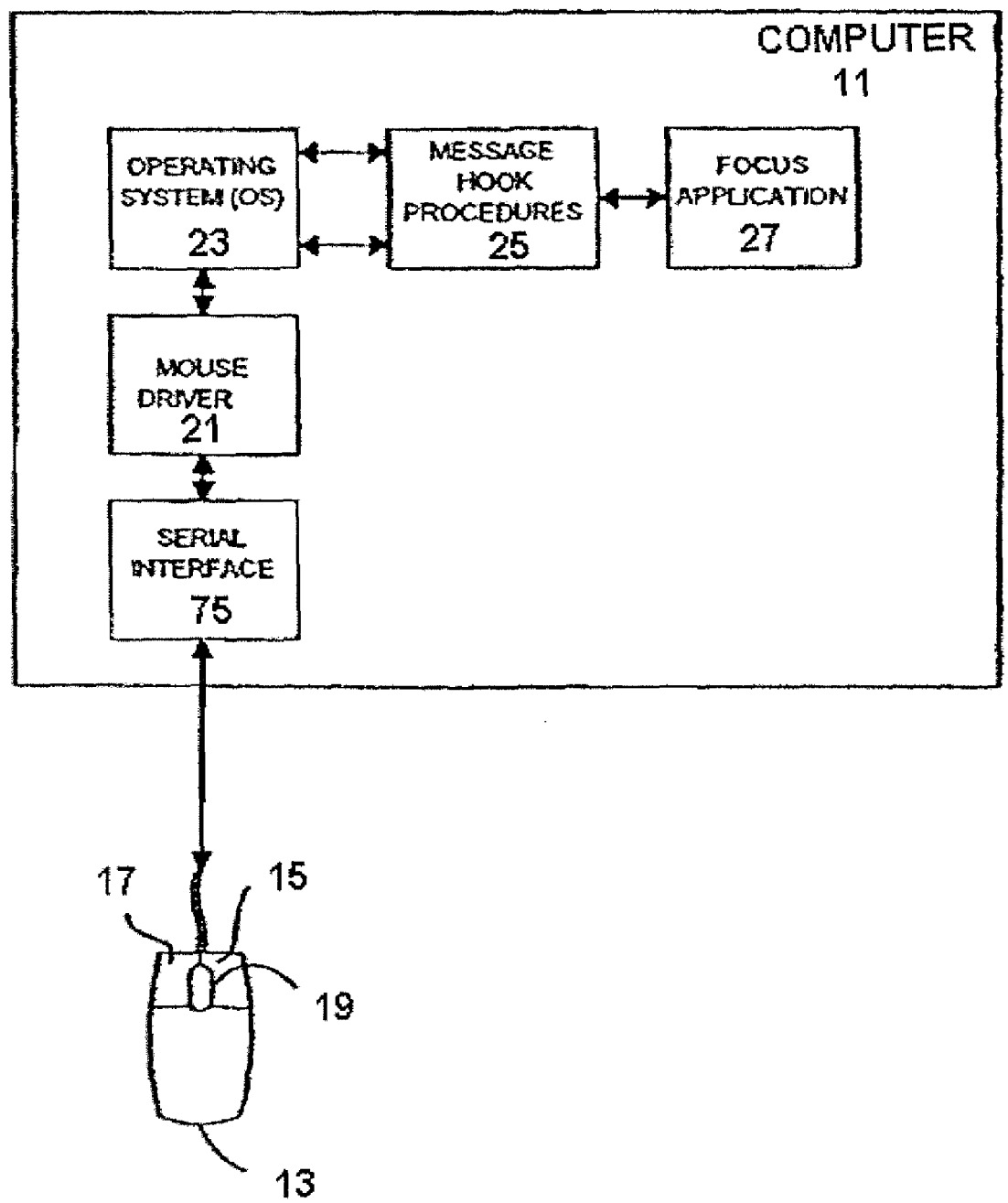
FIG. 2 is a functional block diagram of a host computer and associated cursor control device to which the present inventive systems may be applied.
Figure 3:
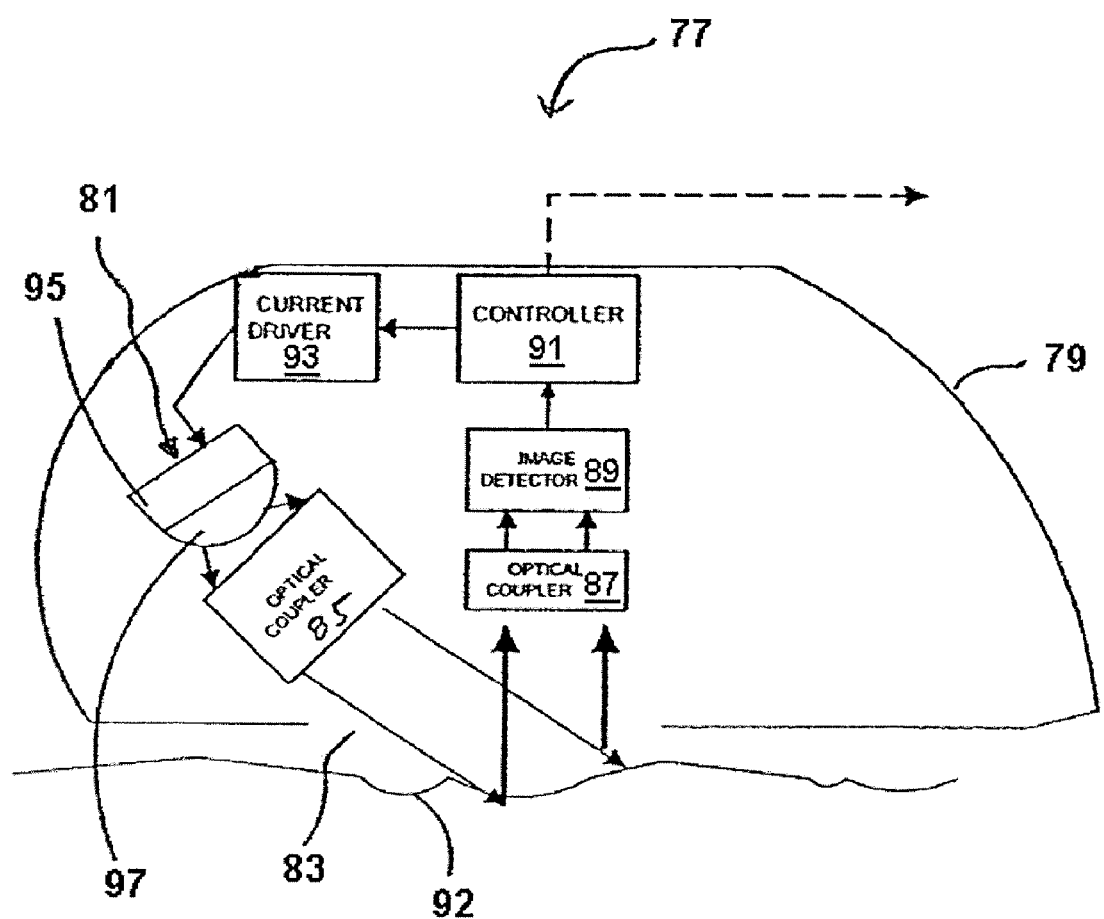
FIG. 3 is a schematic depiction of an exemplary optically tracking computer mouse, to which the present inventive capacitive sensing system may be applied.

FIG. 2 is a functional block diagram of a computer 11 used with an exemplary mouse 13 to which the present invention may be applied. Mouse 13 illustratively has right and left buttons 15, 17 and a depressible, rotatable scroll wheel 19 located therebetween. Obviously, mouse 13 may have more actuators (such as thumb actuation buttons or more finger actuation buttons), fewer actuators (such as only a single button or two buttons) or different types of actuators (such as triggers, rollers, etc.). Mouse 13 may instead be another type of cursor control (pointing) device, such as a trackball device. Computer 11 has firmware and/or software providing a mouse driver 21, an operating system 23, a message hook procedure 25, and a focus application 27. To better understand the operation of input device 13 in computer system 11, the components of that system are discussed in connection with a mouse packet data structure as illustrated in FIG. 3. Of course, it will be appreciated that re-arrangements of the data portions within the data structure or different data portions can be used. For example, where different actuators are used, the data structure will change accordingly.

To initiate a mouse message, the user first manipulates mouse 13. Based on this manipulation, mouse 13 generates a mouse packet that is passed to serial interface 75 and which is indicative of the manipulation event. When serial interface 75 receives mouse packet, it converts the serial information in the mouse packet into a set of parallel packets and provides the parallel packets to mouse driver 21. Mouse driver 21 creates a mouse message based on the manipulation event in a conventional manner.

The mouse message is then transmitted to operating system 23. Operating system 23 may be a Microsoft "WINDOWS" operating system, e.g., "WINDOWS NT®," "WINDOWS 95®," "WINDOWS 98®," "WINDOWS 2000®", or "WINDOWS XP®." Of course, other operating systems can be used as well, such as OS/2 from IBM Corporation, or UNIX, LINUX, or Apple operating systems, as well as myriad embedded application operating systems, such as are available from Wind River, Inc. Operating system 23 includes a mouse message hook list that identifies a series of mouse message hook procedures 25. When operating system 23 receives the mouse message from mouse driver 21, it examines the mouse message hook list to determine if any mouse message hook procedures have registered themselves with operating system 23. If at least one mouse message hook procedure has registered itself with operating system 23, operating system 23 passes the mouse message to the registered mouse message hook procedure 25 that appears first on the list.

The called mouse message hook executes and returns a value to operating system 23 that instructs the operating system to pass the mouse message to the next registered mouse message hook.

The mouse message may, for example, represent a command to an application which "owns" the window currently under focus in computer 11. In that instance, the message hook procedure 25 issues the command to the focus window application 27. In response, the focus window application 27 performs the desired function.

After the message hook procedure 25 issues the command to the focus application 27, the message hook procedure 25 consumes the mouse message by removing the message from the message chain. This is accomplished by returning a value to operating system 23 which indicates to the operating system that it should not pass the mouse message to any other message hook procedures.

FIG. 4 is a more detailed diagram, in partial block form and partial schematic form, illustrating an optical surface tracking mouse 77 to which the present inventive systems may be applied. Mouse 77 includes a housing 79, an electromagnetic radiation source (which may be a light source such as an LED) 81, an aperture 83 defined in the bottom of housing 79, a first optical coupler 85, a second optical coupler 87, an image or pattern detector 89, a controller 91, and a current driver 93. In FIG. 4, optical mouse 77 is shown supported relative to a work surface 92. Pattern or image detector 89 can be any suitable detector which is capable of detecting images or patterns from information carried by electromagnetic radiation impinging thereon and providing a signal indicative of such patterns or images. Pattern detector 89 may be an artificial retina pattern detector, for example, as described in greater detail below.

As mentioned, light source 81 can be any suitable source of electromagnetic radiation which can be used to provide radiation for impingement on a pattern or image and which can then be detected by pattern detector 89. In one illustrative embodiment, light source 81 includes an LED 95 and an integral lens 97. Source 81 could also be a surface mounted LED, or a low grade laser (with a wavelength in the nanometer range), for example.

Radiation emitted from LED 95 is transmitted through integral lens 97 (which is illustratively a dome shaped clear optical piece of material such as glass or plastic integral with the casing of LED 95) such that it impinges on optical coupler 85. As is described in greater detail below, optical coupler 85 collects radiation emitted by LED 95 and shapes it. The radiation exits optical coupler 85, passes through housing aperture 83 and impinges upon work surface 92. Work surface 92 may be an ordinary planar work surface, e.g., desktop, having no predetermined pattern or texture thereon, or it may be a surface provided with a predetermined pattern, texture or image. The light reflects off of work surface 92 toward optical coupler 87. Optical coupler 87 illustratively includes a lens which collects the radiation reflected from surface 92 and directs it to, and focuses it on, image detector (e.g., artificial retina) 89.

Image detector 89 generates an image signal indicative of an image or pattern on work surface 92, based on the radiation reflected from work surface 92. The image signal is provided to controller 91 which computes position information based on the image signal. The position information indicates movement of mouse 77 relative to work surface 92, e.g., in a manner such as is described in the above-identified (and incorporated by reference) patents and patent applications. Position information is provided by controller 91 in the form of an information packet, which may be transmitted to computer 11 through a cable, or through a wireless transmission link such as an infrared, ultrasonic, or radio frequency (RF) link. The position information provided by controller 91 may be provided according to a conventional serial or parallel interface format, such as universal serial bus (USB), FireWire™, I²C, PS2, ECP and EPP interface formats.

As mentioned, image detector 89 may be an artificial retina. A suitable artificial retina manufactured by Mitsubishi Electric Corporation includes a two-dimensional array of variable sensitivity photo detectors (VSPDs) and operates in a known manner. Briefly, the VSPDs are formed by a side-by-side pair of diodes integrated onto and separated by a semi-insulated GaAs layer (pn-np structure). In one embodiment, the array is a 32×32 element array, but the array could be made larger or smaller as desired. The photo detector current depends, both in sign and magnitude, on an applied voltage. Such VSPDs exhibit an analog memory effect which stores conductivity information when a voltage is applied in the presence of an optical write pulse. This information is retrieved by injecting an optical readout pulse.

As a further example, image detector 89 may be provided as part of an optical tracking IC available from Agilent Technologies Inc. of Palo Alto Calif., e.g., the ADNS 2030 and 2050 ICs. Associated imaging componentry (e.g., LED light source and optical coupling assembly) is also available from Agilent, alone or as part of a complete optical tracking engine kit intended for use in the design of an optically tracking mouse.

Image processing in such devices is based on optical matrix-vector multiplication, or approximations thereof. An input image is projected onto the device as a weight matrix. All VSPDs have one electrode connected along rows, yielding a sensitivity control vector. Thus, the VSPD sensitivity can be set to arbitrary values in each row within a certain range. In addition, the remaining VSPD electrode is connected along columns, yielding an output current vector defined by the matrix vector product of the weight matrix times the sensitivity control vector.

In an illustrative embodiment, image detector 89 is controlled, by controller 91, to perform edge extraction operations. The sensitivities of two adjacent detector rows are set to +1 and −1, respectively, whereas all other sensitivities are set at 0. In this embodiment, the output current is proportional to the difference in light intensities of the two active rows. By shifting the control voltage pattern in a cyclical manner (0, +1, −1, 0, 0, etc.), the horizontal edges of the input image are sensed. Thus, the system operates in a time sequential and semi-parallel mode.

In the illustrated embodiment, mouse 77 also includes a current driver 93 which is coupled to source 81. With this arrangement, controller 91 can be configured to intermittently sense the intensity of the radiation generated by source 81 and adjust the current provided to source 81 through current driver 93. In other words, if the sensed intensity is lower than a desired range, controller 91 may provide a feedback signal to current driver 93 to boost the current provided to source 81, in order to increase the intensity of the electromagnetic radiation emanating from source 81. If, on the other hand, the intensity of the radiation is higher than a desired range, controller 91 may provide a feedback signal to current driver 93 to reduce the current provided to source 81, to thereby reduce the intensity of the radiation emitted from source 81. This may be done to maximize the signal/noise ratio of the reflected image information. It may also serve as a means, in addition to the present inventive power management systems and methods, for reducing the overall power consumption of mouse 73.

Additional detail concerning the ways in which controller 91 may receive image signals from image detector 89 and process the image signal to generate position information are set out in the co-owned Adan et al. patent and co-pending patent applications mentioned (and incorporated by reference) above. These details are not directly relevant to (and are not necessary to an understanding of) the capacitive sensing system of the present invention. It should be noted, however, that such signal processing consumes considerably more power (typically 20–30 mA) than the signal processing associated with conventional opto-electrical encoder wheel systems (typically 1–2 mA). Additional power is also required for driving the light source of the optical tracking system.

As previously mentioned, a mouse to which the present inventive systems may be applied may have a wireless (e.g., RF or infrared) data link to a host computer. Such a system, including a mouse 99 and a receiver 101, is diagrammatically depicted in FIG. 5. Receiver 101 is an RF receiver that connects to a personal computer 103 with a universal serial bus (USB) cable. Mouse 99 incorporates an RF transmitter and may incorporate an optical tracking system as has been described. Mouse 99 may be used in an ordinary fashion, e.g., a user can move a cursor across a computer screen by moving the mouse over a flat (planar) surface, and can control the actions of an on-screen cursor in a conventional "point and click" manner. When a user moves mouse 99 and clicks its buttons, mouse 99 generates binary data representing this activity, encapsulates the data into packets, and sends the packets to receiver 101 as radio frequency (RF) signals. The RF transmission may be carried out in a known manner, the details of which are not necessary to an understanding of the present inventive sensing systems. If receiver 101 recognizes mouse 99, it sends the binary data to computer 103. The computer then reacts to the data to cause, for example, the cursor to move across the screen (monitor) 105.

Typically, two AA alkaline batteries will power mouse 99 with a capacity of about 2500 mAh. In order to conserve the limited battery power, a power management system in accordance copending U.S. application Ser. No. 09/948,099 may be used to power down the mouse when it is not in use. As part of the system, a touch/proximity sensor utilizing a novel system and method of capacitive sensing in accordance with the present invention may be employed to provide an indication of usage.

In accordance with the inventive capacitive sensing systems of U.S. application Ser. No. 09/948,099, a relative increase in a capacitance between a conductor and a device ground signals the presence of an object or body portion in contact with or close proximity to another object. As applied to a user operated data input device, the system signals the presence or absence of a user's hand or other operation instrumentality (e.g., a pen of pen based data input device) in contact with or close proximity to the device. As applied to mouse 99, the capacitive sensing system senses the presence of a user's hand on or in close proximity to mouse 99.

A change in the size of a relatively small capacitor formed between a sensor plate and its surroundings (a relative device ground) is detected by way of a charge transfer technique, in a manner which avoids processing intensive (and relatively slow) capacitance measurements by an A/D converter or the like. By way of analogy, a change in the relative size of the small ("scoop") capacitor may be determined by repeatedly dumping the charge of scoop capacitor into a larger ("bucket") capacitor, and counting the number of "scoops" required to "fill" the bucket capacitor. The "scoop" capacitor is modulated by the touch or close proximity of a user's hand, for example. The closer the user's hand is to the mouse, the larger the apparent size of the scoop capacitor. By counting the number of "scoops" it takes to fill the "bucket," a capacitance change initiated by a change in the user's hand proximity, as the user touches/removes his hand from the mouse, can be detected.

The present invention builds on the disclosure of U.S. application Ser. No. 09/948,099, by providing a system and method for reducing the time and energy it takes to determine a physical count of "scoops" required to "fill" the bucket capacitor. The efficiency of the algorithm is improved, and that improvement may be used to extend the battery life of the product in which the algorithm is employed.

U.S. application Ser. No. 09/948,099 describes methods and systems for detecting a change in environmental capacitance caused by the proximity of a human user hand, which allow power to be saved by turning "off" the high current systems, e.g., tracking systems, when the mouse, keyboard, etc., is not in use. The determination of this condition involves periodic sequences of microprocessor operation, causing increased current draw during the detection interval. This interval remains relatively long, because each time the touch system is operated a count is generated as the "bucket" capacitor is charged from 0 volts up to an arbitrary threshold determined by an internal comparator. The present inventor recognized that counts in a typical system may accumulate to 100 or more, while the difference between a "touch" event and "no-touch" event might only exhibit itself as a count of +/−5 counts around this value. For sensing purposes, the area of interest is this difference and not the succession of counts leading up to the final number. According to the present invention, a repeatable offset charge is injected into the bucket capacitor at the initiation of the detection sequence. Such an offset allows the count range to be reduced by an amount proportional to the offset charge induced into the bucket capacitor.

According to exemplary embodiments of the invention, and with reference to FIG. 5, a resistor (e.g., 30 kOhm) or other impedance element 184 may be wired to an unused or multifunction port pin of µP 1, which allows the microprocessor, with the port pin functioning as a voltage source, to inject current into bucket capacitor 183 prior to the detection sampling interval. In lieu of a resistor, impedance 184 could be an inductor used to "flyback" a precharge to the bucket capacitor, or a further capacitor from which a precharge could be transferred. Still further, an external impedance element could be omitted and the port pin of µP 1 could be set as a current source for a deterministic time, to precharge the bucket capacitor to a repeatable level.

In the case that the pin is set as a voltage source to charge the bucket capacitor through a resistor, charge injection is a function of the applied voltage duration (time), the resistor value, and the bucket capacitor value. The precharge is made repeatable and, theoretically, may be set at any level producing a voltage below the threshold level of the I/O cell. As a practical matter, however, the threshold level of the I/O cell has an uncertainty, due to the fabrication process used to build the silicon, of about +−12%. On top of that, there is generally some variation in clock timing, and the capacitance of the bucket capacitor and scoop capacitor can vary as well, perhaps an additional 10%. Additionally, there is an environmental element to the scoop capacitor charge variation that affects the counts. Taking into account these sources of process variability, it may be desirable to maintain a safety margin, by choosing a precharge of approximately ⅔ of the nominal bucket capacitor "capacity," or less, taking into account the average detection threshold of the microprocessor or ASIC involved.

Each sample (count) set may then accumulate to 20 or 30 counts for example, instead of 100–110 counts. The sampling duration is thus reduced to ¼ of the time duration previously required. Assume a non-offset system has a "touch" value of 100 counts and non-touch value of 110. In this case approximately 10% of the resulting counts are used to resolve hand presence=10/100. Now consider an offset system where hand presence accumulates to 20 counts, and hand absence to 30 counts. In this case, the difference is 10/20 or 50%. Assuming an interval of 100 mS between sampling cycles and a 5 mS sampling duration, then with a 2 mA gross current (hand-off) draw, the total power draw would be reduced from a 100 uA average to 33 uA. The gross power saving which is achievable in this example is 3:1 (hand-off), and this ratio may be altered by the potential to increase the sampling periodicity (frequency) to improve responsiveness. Since the total number of counts may be reduced to the range of 20–30, the possibility of external noise perturbations that affect the quality of the determination may also be reduced. External transient events commonly occur and can affect the number of counts. A shorter detection period improves the statistical probability of "getting the right answer," i.e., improved error margin.

Utilization of an offset charge provides an advantage in terms of reduced time and power requirements for carrying out detection sampling. These gains can be traded back to improve resolution (increase granularity) in hand/object detection as well as detection of non-touch related environmental capacitance variation, thus reducing system sensitivity to noise. To this end, for example, the size of the bucket capacitor could be increased from 4.7 nF to 7.5 nF causing the count interval to range from 30 (for touch) to 45 (for no touch). Corresponding to the increase in size of the bucket capacitor, if the bucket capacitor is charged by way of a voltage source and resistor, the resistance value would preferably be dropped by the same ratio, e.g., to 20 kOhms. In this case, power savings would be reduced to approximately 2:1, but granularity of the touch detection would increase 50% (from 10 to 15 counts). Such increased granularity may be useful, e.g., to permit discrimination between hand approach and actual touch conditions, that may in turn be used for power management or other functions. As one example, to improve device responsiveness while retaining power efficiency, it may be desirable to begin the power-up process of certain device components upon detection of a hand approach, while other components (taking less time to power-up) are not powered-up until actual hand contact is detected.

As mentioned, an alternative to use of an external resistor or other impedance is to use an internal current limiting (current source) functionality of the involved I/O port of µP 1, and carefully time the application of power. Typically, an I/O port impedance might be on the order of 100 Ohms as an FET source or sink impedance, although the source impedance is somewhat dynamic and non-linear. As is known, by carefully controlling the process used to create the IC, these FETs can be made usable as a current limited source. Microprocessors that provide this functionality are available off-the-shelf. In an ASIC configuration, these I/O FETs can be biased to provide a relatively precise current. Utilizing a simple digital counter, such a small current source may be turned on for a finite, controllable time, to inject a deterministic number of coulombs of charge into the bucket capacitor. Alternatively, essentially the same result may be achieved using a tuned circuit such as an inductor in series, or flyback, with the capacitor, and a shorter time interval.

In a first embodiment, the present invention works by sequentially charging "scoop" capacitor 181, and dumping it into relatively large, preferably fixed size bucket capacitor 183. Bucket capacitor 183 may, e.g., have a capacitance C of 4.7 nF, whereas the capacitance of the scoop capacitor may vary within the range of 15–45 pF. The filling/dumping process is continued until bucket capacitor 183 is "full." An increase in the size of scoop capacitor 181, indicative of the presence or absence of a user's hand in contact with or close proximity to the mouse, can then be determined by how many "scoops" it took to fill the bucket. This general process is the same as is described in U.S. application Ser. No. 09/948,099.

In the present case, however, the algorithm is modified by "filling" the bucket partially full before counting the "scoops." In this way, the number of "scoops" is reduced.

As seen in FIGS. 1 and 5, a preferred implementation uses three I/O pins A, B and C of μP 1 to control the filling, dumping (charge transferring) and input threshold switch sampling actions. Pin C is connected, through resistor (or other impedance) 184, to pin A. In the alternative, and as mentioned, also applicable would be an internal current source used in lieu of impedance 184. Obviously, other hardware/software/firmware arrangements may be utilized in order to achieve the same or similar result, including arrangements of discrete circuit elements, or an ASIC, in lieu of firmware programmed μP 1. The following steps may be executed by μP 1 under firmware control:

1) uP clamps Pins A, B, and C to ground, to discharge bucket capacitor 183. Counter=0.
   a. Pin A is set to high impedance.
   b. Pin C is set to a 1 or positive voltage. Through a charging resistor or source impedance, a finite charge is loaded into bucket capacitor 183. The charge is selected to be less than that required to "fill" the bucket capacitor. The total charge is a function of the positive voltage, the charging time, and the series impedance between pin C and pin A connected to bucket capacitor 183. (In the event of an internal current source, such as in an ASIC implementation, the total charge would be a function of the current source value and activation time).
   c. Pins B and C are set to high impedance.
2) With pin B still set to be a high impedance input (floating), Pin A is set high to charge the scoop capacitor (without charging bucket capacitor 183).
3) Pin A is set to be a high impedance input (floating), and Pin B is driven low, to dump the charge from scoop capacitor 181 into bucket capacitor 183.
4) Counter=counter+1 (count one scoop).
5) Pin A (still a high impedance input) is sampled to see if it has crossed an input high threshold (indicates a bucket "full" condition). If not, steps 2–5 are repeated.
6) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

Thus, following each cycle of charge transfer (after the initial charging of the bucket capacitor to its repeatable non-zero reference charge), an input threshold switch of μP 1, e.g., a CMOS transistor connected to pin A, is checked to determine whether its threshold (e.g., ½ Vcc=1.55V±20%) has been reached. When it has, this indicates that the bucket capacitor is "full." A counter is incremented for each check, up to the point that the threshold voltage is exceeded. The presence of a hand on (or in close proximity to) the mouse is determined when the count related value (TouchVal) falls below a predetermined threshold count value (which is preferably dynamically adjusted in a manner to be described). The aforementioned touch-on (ON) or touch-off (OFF) signals are generated based upon this determination.

As described so far, TouchVal is a count value or moving average count value. It will be understood, however, that TouchVal could instead be another variable related to the count, e.g., a time value providing a proxy indication of the number of cycles of charge transfer required to reach the input high threshold.

In a "low-side" variation of the above technique, sampling is carried out at Pin B (instead of Pin A) at the time that Pin B is set to be a high impedance input. A CMOS transistor threshold switch of a typical controller will transition from low-to-high at a voltage that is somewhat different than the high-to-low transition point. This difference can be utilized to provide different resolutions of the count value. In carrying out the "low-side" variation, μP 1 may execute the following steps:

1) uP 1 clamps pins A, B and C to ground, to discharge bucket capacitor 183 and scoop capacitor 181. Counter=0.
   a. Pin A is set to high impedance.
   b. Pin C is set to a 1 or positive voltage. Through a charging resistor or source impedance, a finite charge is loaded into the bucket capacitor. The charge is selected to be less than that required to "fill" the bucket capacitor. The total charge is a function of the positive voltage, the charging time, and the series impedance between Pin C and Pin A connected to bucket capacitor. (In the event of an internal current source, such as in an ASIC implementation, the total charge would be a function of the current source value and activation time.)
   c. Pins B and C are set to high impedance.
2) With Pin B still set to be a high impedance input (floating), Pin A is set high to charge the scoop capacitor (without charging bucket capacitor 183).
3) Pin B (still a high impedance input) is sampled to see if it has crossed an input low threshold (indicates a bucket "full" condition). If crossed, proceed to step (7). If not crossed, continue to step (4).
4) Pin A is set to be a high impedance input (floating), and Pin B is driven low, to dump the charge from scoop capacitor 181 into bucket capacitor 183.
5) Counter=counter+1 (count one scoop).
6) Repeat steps 2–5.
7) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

In an alternative embodiment that may be carried out with the circuit arrangement of FIG. 5, TouchVal may be representative of a number of cycles required to dump (rather than charge) bucket capacitor 183 through the scoop capacitor 181. Again, by way of analogy, the bucket is initially "filled," and then it is emptied, scoop by scoop, until a threshold low (or high) voltage is detected indicating that the charge of the bucket capacitor has been "emptied," i.e., reduced below a threshold level. In carrying out this alternative embodiment, µP 1 may execute the following steps:

1) uP 1 drives Pin A high and Pin B low to charge the bucket capacitor; Pin C is set to high impedance.
    a. Pin A is set to high impedance.
    b. Pin C is set to a 0 or ground voltage. Through a discharging resistor or source impedance, a finite charge is emptied from the Bucket capacitor. The charge is selected to be less than that required to "empty" the bucket capacitor. The total charge is a function of the positive voltage, the discharging time, and the series impedance between Pin C and Pin A connected to bucket capacitor 183. (In the event of an internal current sink, such as in an ASIC implementation, the total charge would be a function of the current sink value and activation time.)
    c. Pins B and C are set to a high impedance.
2) Pin A is driven low while Pin B remains set as a high impedance input (floating), to dump the charge of scoop capacitor 181 to ground (without dumping the charge of bucket capacitor 183).
3) Pin A is set to be a high impedance input (floating) and Pin B is driven low, resulting in a transfer of charge from bucket capacitor 183 to scoop capacitor 181.
4) Counter=counter+1 (count one scoop).
5) Pin A (still a high impedance input) is sampled to see if it has crossed an input low threshold (indicates bucket is "empty"). If not, steps 2–5 are repeated.
6) Algorithm is complete; as in the first embodiment, the Counter value is inversely proportional to a relative size of the scoop. The lower the Counter value, the greater the capacitance of the scoop capacitor. TouchVal may be set as the Counter value itself, a moving average of the Counter value, or a value otherwise related to the Counter value, e.g., a corresponding time value.

The polarity of the charge in step (1) may be reversed such that Pin B is driven high and Pin A is driven low to charge the bucket capacitor. In this case, Pin A is sampled in step (5) to see if it crossed an input high threshold.

Similar to the first "bucket filling" embodiment, sampling may be carried out in the above "bucket emptying" embodiments at Pin B (instead of Pin A), at the time that Pin B is set as a high impedance input. In carrying out this variation, IP 1 may execute the following steps:

1) uP 1 drives Pin A high and Pin B low to charge bucket capacitor 183; Pin C is set to high impedance.
    a. Pin A is set to high impedance.
    b. Pin C is set to a 0 or ground voltage. Through a discharging resistor or source impedance, a finite charge is emptied from the Bucket capacitor. The charge is selected to be less than that required to "empty" the bucket capacitor. The total charge is a function of the positive voltage, the discharging time, and the series impedance between Pin C and Pin A connected to the bucket capacitor 183. (In the event of an internal current sink, such as in an ASIC implementation, the total charge would be a function of the current sink value and activation time.)
    c. Pins B and C are set to a high impedance.
2) Pin A is driven low while Pin B remains set as a high impedance input (floating), to dump the charge of scoop capacitor 181 to ground (without dumping the charge of bucket capacitor 183).
3) Pin B (still a high impedance input) is sampled to see if it has crossed an input high threshold (indicates bucket is "empty"). If crossed, proceed to step (7). If not crossed, then continue to step (4).
4) Pin A is set to a high impedance input (floating) and Pin B is driven low, resulting in a transfer of charge from bucket capacitor 183 to scoop capacitor 181.
5) Counter=counter+1 (count one scoop).
6) Repeat steps 2–5.
7) Algorithm is complete; as in the first embodiment, the Counter value is inversely proportional to a relative size of the scoop. The lower the Counter value, the greater the capacitance of the scoop capacitor. TouchVal may be set as the Counter value itself, a moving average of the Counter value, or a value otherwise related to the Counter value, e.g., a corresponding time value.

The polarity of the charge in step (1) may be reversed such that Pin B is driven high and Pin A is driven low to charge the bucket capacitor. In this case, Pin B is sampled in step (3) to see if it has crossed an input low threshold.

In a further alternative embodiment that may be carried out with the circuit arrangement of FIG. 7, TouchVal may be representative of a number of cycles required to "fill" bucket capacitor 183 by way of a voltage applied to bucket capacitor 183 and scoop capacitor 181 connected in series. In this case, a per-cycle increase in charge of bucket capacitor 183 is regulated by the relative size of scoop capacitor 181. In carrying out this alternative embodiment, µP 1 may execute the following steps:

1) uP 1 clamps Pins A, B and C to ground to discharge bucket capacitor 183 and scoop capacitor 181. Counter=0.
    a. Pin B, is set to high impedance.
    b. Pin C is set to a 1 or positive voltage. Through a charging resistor or source impedance, a finite charge is loaded into the Bucket capacitor. The charge is selected to be less than that required to "fill" the bucket capacitor. The total charge is a function of the positive voltage, the charging time, and the series impedance between Pin C and Pin B connected to bucket capacitor 183. (In the event of an internal current source, such as in an ASIC implementation, the total charge would be a function of the current source value and activation time.)
    c. Pins A and C are set to high impedance.
2) While Pin A remains set as a high impedance input (floating), Pin B is set high; this puts the bucket and scoop capacitors in series. The same current flows through both capacitors, and when the scoop capacitor is filled current stops flowing through both the bucket capacitor and the scoop.
3) Pin B is set to be a high impedance input (floating), and Pin A is driven low, to discharge the scoop capacitor (without discharging the bucket), so that it may be filled again.
4) Counter=counter+1 (count one scoop).
5) Pin B (still a high impedance input) is sampled to see if it has crossed an input high threshold (indicates a bucket "full" condition). If so, proceed to step (6). If not, repeat steps 2–5.
6) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

In a "low-side" variation of the above-described further alternative embodiment, sampling is carried out at Pin A (instead of Pin B) at the time that Pin A is set to be a high impedance input. In carrying out this variation, µP 1 may execute the following steps:

1) uP 1 clamps Pins A, B and C to ground to discharge bucket capacitor 183 and scoop capacitor 181. Counter=0.
   a. Pin B is set to high impedance.
   b. Pin C is set to a 1 or positive voltage. Through a charging resistor or source impedance, a finite charge is loaded into the Bucket capacitor. The charge is selected to be less than that required to "fill" the bucket capacitor. The total charge is a function of the positive voltage, the charging time, and the series impedance between Pin C and Pin B connected to the bucket capacitor. (In the event of an internal current source, such as in an ASIC implementation, the total charge would be a function of the current source value and activation time.)
   c. Pins A and C are set to high impedance.
2) While Pin A remains set as a high impedance input (floating), and Pin B is set high; this puts the bucket and scoop in series. The same current flows through both capacitors, and when the scoop capacitor is filled current stops flowing through both the bucket capacitor and the scoop capacitor.
3) Pin A (still a high impedance input) is sampled to see if it has crossed an input low threshold (indicates a bucket "full" condition). If so, proceed to step (7). If not, then continue to step (4).
4) Pin B is set to be a high impedance input (floating) and Pin A is driven low, to discharge the scoop capacitor (without discharging the bucket) so that it may be filled again.
5) Counter=counter+1 (count one scoop).
6) Repeat steps 2–5.
7) Algorithm is complete; Counter value is inversely proportional to a relative size of the scoop capacitor. The lower the Counter value, the greater the capacitance of the scoop capacitor. The Counter value may be used directly as a current touch value (TouchVal), or may be averaged into a new touch reading, e.g., TouchVal=(TouchVal+Counter)/2, in which case TouchVal is a moving average value.

As has been described, touch-on (ON) and touch-off (OFF) signals may be generated based upon a direct determination of whether the count related value (TouchVal) falls below a predetermined threshold count value. An enhanced sensing algorithm for determining and outputting a touch/proximity or no touch/proximity flag (ON/OFF), with better immunity to noise and non-touch related environmental changes, is now described with reference to FIG. 6. This algorithm corresponds to a sensing algorithm described in commonly owned copending application Ser. No. 09/948,099.

As a matter of convenience, the terms "touch," "touching," etc. are used in the following description of the algorithm to refer to touch and/or close proximity. The touch flag ON is set when the algorithm (state machine) is in the stOn or stOnPos states 187, 189, and is cleared in the stOff and stOffPos states 191, 193. The touch algorithm periodically reads a new touch value (TouchVal) using the above-described counting algorithm. The following is a list of variables that may be used in the sensing algorithm:

TouchVal Current touch reading (result from above counting algorithm).

TouchOff Current OFF threshold value.

TouchAvg In the ON states, holds a filtered (pseudo-average) value which is used in the comparison to enter the "stOff" state (see below).

TouchCnt A filtering count value used in the different touch states.

There are four different states the touch algorithm can be in:

stOff: User is not touching, algorithm waiting to go ON. A check for entering the "stOn" state (see below) is performed here.

StOffpos: User is not touching, TouchVal>TouchOff value. This state is a filter, and ratchets TouchOff up slowly.

StOn: User is touching; algorithm is waiting to go to the "stOff" state

StOnPos: User is touching, TouchVal>TouchAvg. This state is a filter which ratchets TouchAvg up slowly. A check for entering the stOff state is performed here.

Figure 6:
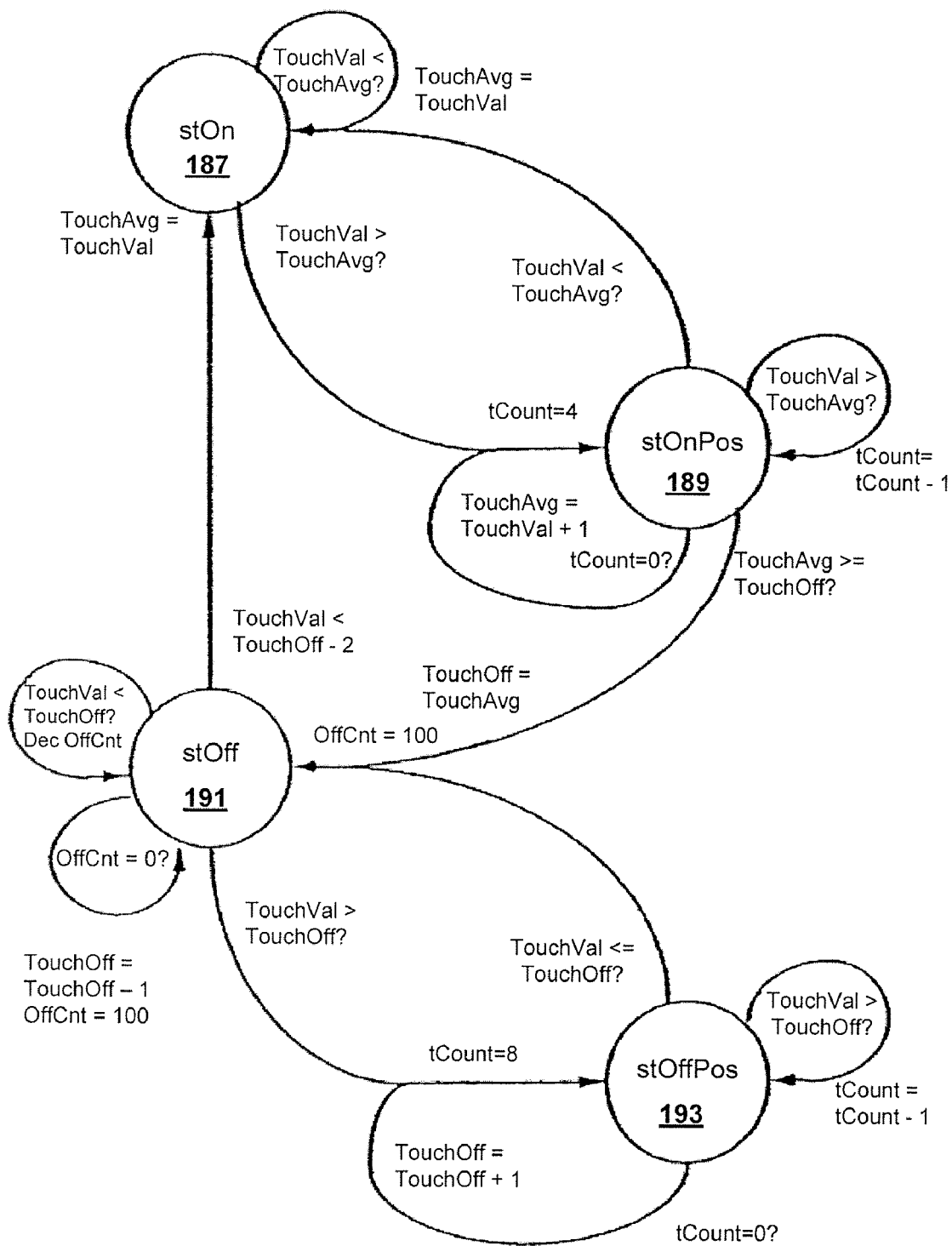
FIG. 6 is a state machine diagram illustrating exemplary logic flow and control in accordance with the invention, for carrying out capacitive sensing with circuitry as illustrated in FIG. 5.

With reference to FIG. 6, operation of the touch algorithm may be summarized as follows. The state machine transitions from stOff state 191 to stOn state 187 upon TouchVal falling a predetermined amount below (e.g., more than 2 counts below) TouchOff. The state machine transitions from stOn state 187 to stOff state 191 upon a filtered (pseudo-average) touch value (TouchAvg) reaching or exceeding TouchOff. Each time that TouchVal exceeds TouchAvg, state stOnPos 189 is entered, wherein a counter initially set, e.g., at 4 is decremented. If TouchVal remains higher than TouchAvg such that the counter is decremented to 0, the value of TouchAvg is incremented to TouchAvg+1. TouchAvg is reset to TouchVal upon TouchVal dropping to or below TouchAvg, and upon a state transition from stOff to stOn.

The threshold count value TouchOff is preferably dynamically adjusted in the following manner. When batteries 3 are first installed, the touch-state algorithm is preferably initialized to the stOn state. TouchVal is set to the current touch reading, and the initial TouchOff value is set to a maximum counter value of 255. As TouchVal will not ordinarily ever reach this maximum value, this forces the touch algorithm to remain in the stOn state until the state machine of FIG. 8 transitions to the SHUTDOWN state via a timeout (e.g., 180 sec.) of no mouse activity. At this point TouchOff is reset to TouchAvg, which is determined in the manner described above. Preferably, any transition to SHUTDOWN from another state will cause TouchOff to be set to the current TouchAvg. At this point, the system can generally correctly assume that no hand is present.

If, during stOff state 191, TouchVal exceeds a current value of TouchOff, a state stOffPos 193 is entered wherein a counter initially set, e.g., at 8 is decremented. If TouchVal remains higher than TouchOff such that the counter is decremented to 0, the value of TouchOff is incremented to TouchOff+1. TouchOff is reset to TouchAvg upon a state transition from stOnPos to stOff (which occurs upon TouchAvg reaching or exceeding TouchOff). In stOff state 191, TouchOff is decremented by 1 each time a current touch reading (TouchVal) falls just below TouchOff (e.g., TouchOff−2≤TouchVal<TouchOff) for a preset number of control cycles (e.g., 100).

The preferred states, and state transition conditions, are further described below.

stOn State 187

If TouchVal is<TouchAvg, then TouchAvg is set to the current touch reading (no state change).

If TouchVal is>TouchAvg, then counter TCount is initialized to 4, and the state machine transitions to stOnPos state 189.

stOnPos State 189

If TouchVal is<TouchAvg, then TouchAvg is set equal to TouchVal and the state machine transitions to stOn state 187.

If TouchVal is>TouchAvg, TCount is decremented, and if the count=0 (4 successive TouchVal readings>TouchAvg), then TouchAvg is incremented. This state serves to perform a slow filter for the touch readings, so momentary drops will not unnecessarily put the touch-state machine in the stOff state 191.

If TouchAvg>=TouchOff, then the state machine transitions to stOff state 191 and another counter OffCnt (which may use the same register as TCount) is set to 100. TouchOff is set to TouchAvg.

stOff State 191

If TouchVal is>TouchOff, then the state machine transitions to stOffPos state 193 and counter TCount is set to 8.

If TouchVal is<(TouchOff-2), then the state machine transitions to the stOn state, and TouchAvg is initialized to TouchVal.

If TouchVal is<TouchOff, but >=(TouchOff-2), then counter OffCnt is decremented. If OffCnt=0, then TouchOff is decremented, and OffCnt is reset to 100. This is the case where a lower TouchOff value is learned (i.e., when the mouse is moved to a more capacitive environment). When the mouse state machine enters SHUTDOWN state 165, and the state machine is set to stOff state 191, TouchOff is set to TouchAvg.

stOffPos State 193

If TouchVal is>TouchOff, then TCount is decremented. If TCount=0, then TouchOff is incremented and TCount is reset to 8. This is the condition where a higher TouchOff value is learned (i.e., when the mouse is moved to a less capacitive environment).

If TouchVal is<=TouchOff, then OffCnt is set to 100 and the state machine transitions to the stOff state.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, the use of the labels for algorithm variables appearing in the specification is for convenience and clarity and is not intended to have any limiting effect.

The invention claimed is:

1. A processor-readable storage medium having stored thereon instructions executable by the processor to perform steps of a method for sensing the presence of an object or body portion in contact with or close proximity to another object, the method comprising:

providing a first conductor capacitively coupled to a ground to thereby form a scoop capacitor having a capacitance which varies in relation to the proximity of said object or body portion to said conductor; a pair of second and third conductors forming a bucket capacitor having a capacitance which is larger than a maximum capacitance of said scoop capacitor; and an input threshold switch;

performing switching to selectively: connect at least one of said scoop capacitor and said bucket capacitor to a voltage source to charge said at least one capacitor, set a charge of said bucket capacitor at a repeatable non-zero reference level, vary the charge of said bucket capacitor from said reference level in relation to a relative size of said scoop capacitor, and apply a voltage of said bucket capacitor to said input threshold switch;

detecting an input state of said input threshold switch;

determining a value (TouchVal) relating to a number of cycles of said varying of the bucket capacitor charge, corresponding to a detection of a transition of said input threshold switch; and generating, based upon TouchVal, a signal indicative of an ON state wherein said object or body portion is in contact with or close proximity to said another object, and an OFF state wherein said object or body portion is not in contact with or close proximity to said object.

2. A processor-readable storage medium as recited in claim 1, wherein the at least one capacitor comprises said scoop capacitor and said varying of the charge of said bucket capacitor comprises transferring charge from said scoop capacitor to said bucket capacitor.

3. A processor-readable storage medium as recited in claim 2, wherein:

said first conductor of said scoop capacitor is commonly connected, together with a first one of said pair of conductors of said bucket capacitor, to a first terminal, the second of said pair of conductors of the bucket capacitor being connected to a second terminal, and said first one of said pair of conductors of said bucket capacitor is further connected to a third terminal;

said switching cyclically: (a) clamps the first, second and third terminals to ground, to discharge the bucket capacitor; (b) sets the first terminal to high impedance and drives the third terminal to thereby set the charge of said bucket capacitor to said reference level; (c) sets the second and third terminals to be high impedance inputs and drives the first terminal to charge the scoop capacitor without charging the bucket capacitor, said input threshold switch being connected to one of said first terminal and said second terminal to receive a voltage therefrom when said one terminal is set to be said high impedance input; and (d) sets the first terminal to be a high impedance input and drives the second terminal, to transfer charge of the scoop capacitor to the bucket capacitor; and said detecting comprises sampling, in relation to the cycling through steps (a)–(d), a state of said input threshold switch.

4. A processor-readable storage medium as recited in claim 1, wherein the at least one capacitor comprises said bucket capacitor, and said varying of the charge of said bucket capacitor comprises transferring charge from said bucket capacitor to said scoop capacitor.

5. A processor-readable storage medium as recited in claim 4, wherein:

said first conductor of said scoop capacitor is commonly connected, together with a first one of said pair of conductors of said bucket capacitor, to a first terminal, the second of said pair of conductors of the bucket capacitor being connected to a second terminal, and said first one of said pair of conductors of said bucket capacitor is further connected to a third terminal;

said switching cyclically: (a) drives the first terminal high, drives the second terminal low and sets the third terminal to high impedance, to charge the bucket capacitor; (b) sets the first terminal to high impedance and drives the third terminal low to thereby drop the charge of said bucket capacitor to said reference level; (c) sets the second and third terminals to be high impedance inputs and drives the first terminal low, to discharge the scoop capacitor without discharging the bucket capacitor; and (d) sets said first terminal to be a high impedance input and drives the second terminal, to transfer charge from the bucket capacitor to the scoop capacitor, said input threshold switch being connected to one of said first terminal and said second terminal to receive a voltage therefrom when said one terminal is set to be said high impedance input; and said detecting comprises sampling, in relation to the cycling through steps (a)–(d), a state of said input threshold switch.

6. A processor-readable storage medium as recited in claim 1, wherein the at least one capacitor comprises said scoop capacitor and said bucket capacitor connected in series, and said varying of the charge of said bucket capacitor comprises charging said bucket capacitor with said voltage source, as regulated by said scoop capacitor.

7. A processor-readable storage medium as recited in claim 6, wherein:

said first conductor of said scoop capacitor is commonly connected, together with a first one of said pair of conductors of said bucket capacitor, to a first terminal, the second of said pair of conductors of the bucket capacitor being connected to a second terminal, said first one of said pair of conductors of said bucket capacitor further being connected to a third terminal;

said switching cyclically: (a) drives the first, second and third terminals low, to discharge the bucket capacitor and scoop capacitor; (b) sets the second terminal to high impedance and drives the third terminal high to thereby set said reference level charge of said bucket capacitor; (c) sets the first terminal to be a high impedance input and drives the second terminal high, to place the bucket capacitor and scoop capacitor in series; and (d) sets said second terminal to be a high impedance input and drives the first terminal low, to discharge the scoop capacitor without discharging the bucket capacitor, said input threshold switch being connected to one of said first terminal and said second terminal to receive a voltage therefrom when said one terminal is set to be said high impedance input; and said detecting comprises sampling, in relation to the cycling through steps (a)–(d), a state of said input threshold switch.

8. A processor-readable storage medium as recited in claim 1 including further instructions for performing steps comprising:

comparing TouchVal, or a number derived from TouchVal, with a predetermined threshold value (TouchOff), or a number derived from TouchOff; and wherein said signal generating generates said ON and OFF state indicating signals based upon an output of said comparing.

9. A processor-readable storage medium as recited in claim 8 including further instructions for performing steps comprising:

dynamically adjusting the value of TouchOff in accordance with a relative decrease in the capacitance of said scoop capacitor occurring during said OFF state.

10. A processor-readable storage medium as recited in claim 9 including further instructions for performing steps comprising:

deriving a value (TouchAvg) from TouchVal, wherein said comparing compares TouchAvg with TouchOff during said ON state.

11. A processor-readable storage medium as recited in claim 10, wherein TouchAvg is initially set to equal TouchVal upon a transition from the OFF state to the ON state, and the value of TouchAvg is incremented upon TouchVal exceeding TouchAvg for a predetermined interval.

12. A processor-readable storage medium as recited in claim 11, wherein said decrease in the capacitance of said scoop capacitor is determined from the occurrence of an increase in TouchVal during said OFF state.

13. A processor-readable storage medium as recited in claim 12, wherein said decrease in the capacitance of said scoop capacitor is determined from TouchVal remaining above TouchOff for a predetermined interval.

14. A processor-readable storage medium as recited in claim 8 including further instructions for performing steps comprising: deriving a value (TouchAvg) from TouchVal, wherein said comparing compares TouchAvg with TouchOff during said ON state.

15. A processor-readable storage medium as recited in claim 8, wherein in said signal generating, a transition from said OFF state to said ON state occurs upon TouchVal decreasing below TouchOff by a predetermined amount.

16. A processor-readable storage medium as recited in claim 8, wherein TouchOff is decremented upon TouchVal remaining below TouchOff for a predetermined interval.

17. A processor-readable storage medium as recited in claim 1, wherein TouchVal for a control cycle n is a moving average value.

* * * * *